Patented June 28, 1932

1,865,153

UNITED STATES PATENT OFFICE

THOMAS JAMES TAPLIN, OF KEW, ENGLAND, ASSIGNOR TO METALS PRODUCTION OF NORTH AMERICA INCORPORATED, OF NEW YORK, N. Y., A CORPORATION

HEAT TREATMENT OF COPPER ORES OR THE LIKE

No Drawing. Application filed January 29, 1931, Serial No. 512,217, and in Great Britain January 31, 1930.

This invention comprises improvements in or relating to the heat treatment of copper ores or the like with the object of securing the recovery of copper therefrom. In prior United States Patent No. 1,679,337 a process is described for the recovery of copper from its ores in which the ore is heated in admixture with solid carbonaceous matter in the presence of a halogen at a temperature lower than the melting point of copper and yet adequate to produce a reaction so that the copper is caused to come out of the ore particles which originally contained it and is found outside them in the metallic condition among the charge. It is stated in the said Patent No. 1,679,337 that ores containing sulphides should be subjected to an oxidizing roast before submitting them to the process.

We have now found that if an ore containing copper in the form of sulphate is subjected to heat treatment in admixture with carbonaceous material and in the presence of a segregation agent such as the halogen referred to in the aforesaid patent a reaction occurs by which the copper which was in the form of sulphate is caused to come out of the ore particles which originally contained it and is found outside them among the charge.

In distinction from treatment of oxide ores this segregated copper is found to have been sulphided to a considerable extent, more especially on its surface so that it has not the characteristic color of the metal, but is darkened, in some cases almost to black.

This effect is believed to be due to sulphur-bearing gases evolved during the reaction acting on already segregated copper, which has been derived either from the sulphate or from any accompanying oxide. Such segregated cupriferous material may thereafter be recovered by a concentration process such, for example, as froth flotation concentration. The same is true of ores in which the copper content has been converted to sulphate, say by roasting, and the term "ores and the like" used herein is intended to include such roasted products.

Accordingly, the present invention comprises a process for the recovery of copper from ores or the like in which it exists in the form of sulphate, according to which the ore is admixed with carbonaceous material and a segregation agent and heated to bring about a reaction whereby the copper is caused to come out of the ore particles which originally contained it as sulphate and to be found in a segregated condition, admixed with the charge, and to a greater or less extent combined with sulphur.

Ores which may contain oxide particles in addition to sulphate particles will by this process readily be concentrated as a whole since, as the oxide copper will also be found in the product in the segregated condition, both can be concentrated simultaneously, for example by froth flotation.

Ores in which copper exists wholly as sulphide or in part as sulphide and in part as oxide or sulphate can be treated by first applying a sulphating roast to the ore so that sulphide is brought into the sulphate condition.

In some cases it may be desirable, subsequent to the segregation operation, to effect crushing of the coarser portion of the product prior to treating by flotation.

It has been found that pyrites cinder produced by roasting cupriferous pyrite for sulphuric acid manufacture contains a considerable proportion of the copper content in the form of sulphate and is amenable to treatment by the present invention. In some cases such cinders can with advantage be accorded a short additional roast, or the customary roasting in sulphuric acid manufacture may be extended to convert sulphide contained in the cinder into sulphate.

The following examples are described by way of instances of the application of the process:—

Example I

The ore employed was obtained from the Bwana M'Kubwa mine in Northern Rhodesia and contained 6.2% of copper, of which 3.2% was in oxidized form and 3% in the form of sulphide, mostly as chalcocite. The ore was given a sulphating roast for a period of one hour at a temperature not exceeding 650° C. The size of the ore was such as would pass a screen having twelve meshes to the lineal inch.

Thereafter the ore was subjected to a segregation operation such as is described in United States Patent No. 1,679,337.

The product was submitted to froth flotation concentration and showed a recovery of 93.4% of copper in the original ore in a concentrate which assayed 58.7% of copper.

*Example II*

Pyrites cinders obtained from burning cupriferous pyrite for sulphuric acid making were employed, containing 3.6% of copper of which 1.93% existed in the form of copper sulphate 0.97% in the form of basic sulphate and oxide and 0.7% in the form of sulphide. The size of the material was such as to pass a screen having twelve meshes to the lineal inch. It was subjected to a segregation operation by heating with 2% of charcoal and 0.5% of sodium chloride at 650° C. for one-and-a-half hours in a rotating tubular furnace.

The product was submitted to froth flotation concentration and showed a recovery of 88.3% of the copper in the ore in a concentrate containing 23.8% of copper.

*Example III*

The same material as that employed for Example II was subjected to a preliminary sulphating roast at 650° C. for thirty minutes with the object of converting any sulphide copper present into sulphate. The product was then submitted to a segregation operation and treated by froth flotation as before, whereupon a recovery of 97.4% of the copper was obtained in a concentrate containing 30.7% of copper. Comparison between the charge before segregation in Example II with the roasted material used for segregation in Example III showed that in Example II 0.3% of sulphur existed as sulphide, whereas in the case of Example III only 0.07% of sulphur was as sulphide.

The conversion of sulphide material to sulphate prior to segregation therefore appears to enhance the recoveries.

I claim:

1. The process of concentrating the copper content of material carrying copper in the form of copper sulphate which consists in heating the fine material with a small proportion of carbon and a small proportion of a haloid salt to segregate the copper and leave it darker than metallic copper, and separating the dark copper-bearing portion from the associated gangue.

2. The process of concentrating the copper content of material carrying copper in the form of copper sulphate which consists in heating the fine material with a small proportion of carbon and a small proportion of sodium chloride to segregate the copper and leave it darker than metallic copper, and separating the dark copper-bearing portion from the associated gangue.

3. The process of concentrating the copper content of material carrying copper which consists in heating the fine material to convert copper to a sulphate and thereafter heating the sulphated material with carbon and a halide salt to segregate the copper and leave it darker than metallic copper, and separating the dark copper-bearing portion from the associated gangue.

4. The process of concentrating the copper content of material carrying copper which consists in heating the material finer than ten-mesh to convert copper to sulphate and thereafter heating the sulphated material with a small proportion of carbon and a small proportion of a halide salt at a temperature of about 650° C. to segregate the copper and leave it darker than metallic copper, and separating the dark copper material from the associated gangue by froth flotation.

5. The process of concentrating the copper content of material carrying copper partly in the form of sulphide and partly in another form which consists in heating the fine material at a temperature of about 650° C. to convert copper to sulphate and thereafter heating the sulphated material with a small proportion of carbon and a small proportion of a halide salt so as to segregate the copper and leave it darker than metallic copper, and separating the dark copper material from the associated gangue by froth-flotation.

In testimony whereof I affix my signature.

THOMAS JAMES TAPLIN.